US011736515B2

United States Patent
Li et al.

(10) Patent No.: US 11,736,515 B2
(45) Date of Patent: Aug. 22, 2023

(54) RECONFIGURABLE SWITCH FORWARDING ENGINE PARSER CAPABLE OF DISABLING HARDWARE TROJANS

(71) Applicant: TSINGHUA UNIVERSITY, Beijing (CN)

(72) Inventors: XiangYu Li, Beijing (CN); Fang Yang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 306 days.

(21) Appl. No.: 17/261,849

(22) PCT Filed: Jul. 2, 2019

(86) PCT No.: PCT/CN2019/094332
§ 371 (c)(1),
(2) Date: Jan. 20, 2021

(87) PCT Pub. No.: WO2020/140412
PCT Pub. Date: Jul. 9, 2020

(65) Prior Publication Data
US 2021/0266332 A1    Aug. 26, 2021

(30) Foreign Application Priority Data
Jan. 3, 2019   (CN) .......................... 201910003982.2

(51) Int. Cl.
*H04L 9/40* (2022.01)
*H04L 45/745* (2022.01)
(Continued)

(52) U.S. Cl.
CPC .......... *H04L 63/145* (2013.01); *H04L 45/745* (2013.01); *H04L 49/20* (2013.01);
(Continued)

(58) Field of Classification Search
CPC ....... H04L 63/145; H04L 49/20; H04L 69/22; H04L 49/351; H04L 2463/041
See application file for complete search history.

(56) References Cited

U.S. PATENT DOCUMENTS 7,551,575 B1    6/2009  Aleksandrowicz
10,225,381 B1 * 3/2019  Bosshart ................. H04L 69/22
(Continued)

FOREIGN PATENT DOCUMENTS

| CN | 100574312 C | 12/2009 |
| CN | 104967575 A | 10/2015 |
| CN | 109474641 A | 3/2019 |

OTHER PUBLICATIONS

ISA China National Intellectual Property Administration, International Search Report No. PCT/CN2019/094332, dated Aug. 29, 2019, WIPO, 4 pages.

*Primary Examiner* — Ali S Abyaneh
(74) *Attorney, Agent, or Firm* — McCoy Russell LLP

(57) ABSTRACT

The present invention relates to a reconfigurable switch forwarding engine parser capable of disabling hardware Trojans. The parser comprises a data preprocessing unit, several cascaded basic processing units and an extraction unit, wherein a key path of a basic processing unit of the first stage extracts and shifts a key bit keyword of a key, and sends a result to a data path of the current stage and a key path of the next stage; basic processing units of other stages carry out keyword extraction and shifting on a key frame and the data frame in sequence; and the extraction unit extracts the key frame and the data frame from a basic processing unit of the last stage, and forwards same to a subsequent packet processing part. The present invention can be widely applied to the design of the switch forwarding engine parser.

9 Claims, 1 Drawing Sheet

(51) Int. Cl.
*H04L 49/351* (2022.01)
*H04L 69/12* (2022.01)
*H04L 69/22* (2022.01)
*H04L 49/20* (2022.01)

(52) U.S. Cl.
CPC ............ *H04L 49/351* (2013.01); *H04L 69/12* (2013.01); *H04L 69/22* (2013.01); *H04L 2463/041* (2013.01)

(56) References Cited

U.S. PATENT DOCUMENTS

| | | | |
|---|---|---|---|
| 2005/0256821 A1* | 11/2005 | Mishra | H04L 69/22 |
| 2017/0064047 A1 | 3/2017 | Bosshart | |
| 2017/0213026 A1* | 7/2017 | Wu | G06F 21/76 |
| 2018/0089426 A1* | 3/2018 | Shi | G06F 21/755 |
| 2018/0137290 A1* | 5/2018 | Kwiat | G06F 21/60 |
| 2019/0347417 A1* | 11/2019 | Tehranipoor | G06F 21/566 |

* cited by examiner

RECONFIGURABLE SWITCH FORWARDING ENGINE PARSER CAPABLE OF DISABLING HARDWARE TROJANS

CROSS-REFERENCE TO RELATED APPLICATIONS

The present application is a U.S. National Phase of International Application No. PCT/CN2019/094332 entitled "RECONFIGURABLE SWITCH FORWARDING ENGINE PARSER CAPABLE OF DESTROYING HARDWARE TROJAN," and filed on Jul. 2, 2019. International Application No. PCT/CN2019/094332 claims priority to Chinese Patent Application No. 201910003982.2 filed on Jan. 3, 2019. The entire contents of each of the above-listed applications are hereby incorporated by reference for all purposes.

TECHNICAL FIELD

The present application belongs to the technical field of network switch chip design, and in particular relates to a reconfigurable switch forwarding engine parser capable of disabling hardware Trojans.

BACKGROUND AND SUMMARY

A switch forwarding engine is a core component of a switch chip. Its task is to parse a received second layer packet (also referred as a frame), form a table lookup request for a routing table, send the table lookup request for the routing table to a search engine, perform a forwarding processing to the packet according to a table lookup result returned by the search engine, including modification (replacement, addition, deletion, etc.) of a header of the packet, and finally forward or discard an encapsulated new packet. A packet processing operation is decided by a key field of the packet header and forwarding and classification rules set by a switch, so it is necessary to parse and extract the packet header. A parser of the switch forwarding engine is a functional module that parses the packet header according to a frame format defined by network protocol standards, takes description information (descriptors) such as the packet header, corresponding port information and storage address from an incoming port of the switch forwarding engine, as input data, performs parsing, identification and extraction operations on the key field in the input data, and outputs the result to a subsequent packet processing flow.

Software Defined Network (SDN) is a new network creation architecture and a way to realize network virtualization. For packet parsing technology, the requirement of SDN is supporting user-defined protocols, that is, the chip can identify and parse different frame formats through software programming, which requires the hardware design of the parser to have certain flexibility, that is, the same hardware can be enabled to support the parsing of the packet satisfying the user-defined protocols through software configuration.

Hardware Trojan attack technology is a type of security attack technology which can trigger non-defined behaviors (executing wrong operations or unauthorized operations) of a system to implement the attack under the cooperation of the inside and the outside by implanting a backdoor into hardware. However, no matter which way is adopted, any hardware Trojan attack must be well concealed, in order to avoid being found in a test process, or being mis-triggered in the process of use and thus being exposed prematurely, so it generally has a specific trigger condition. Only when this trigger condition is matched, the hardware Trojan attack can be carried out.

The basic idea of a de-cooperation technology is to scramble (changing codes) the data input to the chip of the switch forwarding engine, change the value of the selected protection field, and descramble the data (recover an original value) when the data leave a protection domain. This process is transparent to the outside. Once there is a Trojan in a certain system, scrambling can disable the sent instruction of triggering the Trojan, so as to achieve the effect of preventing the Trojan from attacking. Specifically, if the Trojan sends out the data in the system through an abnormal channel (eavesdropping), the eavesdropped data cannot be identified because the data are not descrambled. If the Trojan generates illegal data in the system, which are sent out through a normal channel, the data will be destroyed due to the descrambling process. The key of the de-cooperation technology is to determine the positions of scrambling and descrambling, as well as the way of scrambling and descrambling.

However, in a data stream of the switch forwarding engine parser, the parser needs to identify and analyze fields in the received packet based on the original values of the data, so simply scrambling at a data entry and descrambling at an exit will make the packet unable to be parsed. However, if the data are recovered during keyword query, the original input data will appear in the protected domain, which increases the risk of penetration of attack instructions. How to design a parser capable of disabling hardware Trojans is one of difficulties in current parser design.

In order to solve the above problems, the purpose of the present invention is to provide a reconfigurable switch forwarding engine parser capable of disabling hardware Trojans. The parser adopts a reconfigurable hardware implementation mode, that is, the number, position and keyword content of fields in protocol defined frame formats, and corresponding relationships between protocol types and frame formats can be configured by configuring configuration registers and lookup tables (memories) in a chip. At the same time, in order to achieve the purpose of preventing Trojans from attacking and enhance the security of the parser, the present invention adds a de-cooperation function to the parser.

In order to achieve the above purpose, the present invention adopts the following technical solution: a reconfigurable switch forwarding engine parser capable of disabling hardware Trojans, which includes a data preprocessing unit, several cascaded basic processing units and an extraction unit connected with the basic processing unit of a last stage; the basic processing units of all stages are the same in structure and respectively include a data path and a key path; the data preprocessing unit is configured to generate an equal-length key according to a packet header input from a switch Ethernet port and intercepted by the parser, output the key as a key frame to the key path of the basic processing unit of the first stage, perform a bitwise XOR operation on the input packet header and the generated key, and then output an XOR result as a data frame to the data path of the basic processing unit of the first stage; the key path of the basic processing unit of the first stage is configured to perform key keyword extraction and shifting on the key, send an extracted key keyword value to the data path of the basic processing unit of the current stage, and send a shifted key value to the key path of the basic processing unit of the next stage; the data path of the basic processing unit of the first stage performs key field extraction and shifting on the data frame under the participation of the key keyword value extracted by the key path of the current stage, send an offset of an extracted field to the key path of the basic processing unit of the current stage and the key path and data path of the basic processing unit of the next stage, and send a shifted data frame to the data path of the basic processing unit of the next stage; the basic processing units of other stages sequentially perform field extraction and shifting on the received key frame and data frame, and then output the key frame and the data frame to the basic processing unit of the next stage; the extraction unit performs key frame and data frame field extraction in the key path and data path of the basic processing unit of the last stage according to the received key value and the keyword offset, and forwards the result a subsequent packet processing part.

Further, in the basic processing unit of each stage, the data path includes a data frame register unit, a first shifter unit, several first PA units, a PB unit, a PC unit, and several offset buffer units; the input of the data frame register unit is the data frame sent by the data preprocessing unit or the basic processing unit of the previous stage, and the output thereof is connected with the first shifter unit of the current stage; the first shifter unit rightwards shifts a protocol frame header and a payload of the current stage to a fixed starting position of a next layer protocol frame, its input is an offset of a next layer protocol frame header output by the PC unit of the current stage in the current data frame and a data frame output by the data frame register unit of the current stage, and the output thereof is a shifted new data frame; the input of each first PA unit is a key field offset output by the PC unit in the basic processing unit of the previous stage and a data frame to be extracted in the data frame register unit of the current stage, and the output thereof is an extracted fixed-length key field; the input of the PB unit is a fixed-length key field output by each first PA unit of the current stage and a key keyword value output by the key path of the current stage, the output thereof is protocol classification and type information corresponding to a template matching a combination of the input key fields, and if a key field does not match any pattern template, an illegal identifier is sent to the PC unit; the PC unit is a table lookup unit, whose input is protocol classification and type information of the PB unit of the current stage, and the output thereof is a key field offset required by the basic processing unit of the next stage, an offset and a field identifier of each field in an encapsulation frame header of the current stage, and an offset of the data frame of the next stage; when a next layer protocol does not need to be parsed according to the extraction protocol of the current stage and should be skipped, the PC unit outputs a bypass signal to the basic processing unit of the next stage; when what is sent by the PB unit is illegal identifier information, the PC unit outputs an illegal identifier to the basic processing unit of the next stage; after receiving the bypass signal, the basic processing unit of each subsequent stage copies with complete fidelity the key and data frames and the input of the first PA unit to a corresponding port of the next stage, and does not execute other operations any longer; after receiving the illegal identifier signal, the basic processing unit of each subsequent stage copies with complete fidelity the key and data frames to the next stage, does not execute other operations any longer, and copies the illegal identifier to the basic processing unit of the next stage at the same time; the input of the offset buffer unit is all outputs of the offset buffer units of the basic processing unit of the previous stage, and the offset and the field identifier of each field in the encapsulation frame header of the current stage output by the PC unit of the current stage, and the output thereof is all stored data.

Further, the number of the first PA units is determined according to the total length of all keywords to be extracted from the encapsulation frame header correspondingly processed by the basic processing unit of each stage and the keyword bit width that each first PA unit is capable of extracting.

Further, the PB unit contains a match lookup table, in which a mapping relationship between pattern templates and protocol information is stored, and the contents of table entries are capable of being written from the outside through an external port of a table memory, and when matching is performed, a bitwise XOR operation is performed on the matching templates stored in the PB unit and the key from the key path of the current stage, and then matching is performed.

Further, the PC unit contains two lookup tables: a current lookup table and a next stage lookup table; the input of the current lookup table and the input of the next stage lookup table are respectively a current layer protocol type classification identifier and a next layer protocol type classification identifier output by the PB unit; the output of the current lookup table includes an offset and a field identifier of each field in the encapsulation frame header of the current stage and an offset of the encapsulation frame header of the next stage in the current data frame; the output of the next stage lookup table includes a key field offset required by the basic processing unit of the next stage, and the table entry contents of the current lookup table and the next stage lookup table are capable of being written from the outside through an external port of a table memory.

Further, in the basic processing unit of each stage, the key path includes a key register unit, a second shifter unit, second PA units and a splicing unit; the input of the key register unit is the key frame from the previous stage or the data preprocessing unit, and the output thereof is connected with the second shifter unit; the second shifter unit is a shifting unit and rightwards shifts the key of each stage and a subsequent key bit to a fixed starting position of the corresponding stage, its input is the key of the key register unit and the offset of the encapsulation frame header of the next stage output by the data path of the basic processing unit of the current stage in the current data frame, and the output thereof is a shifted new key frame; the number of the second PA units is the same as the number of the first PA units in the data path of the current stage, the input of each second PA unit is a key field offset output by the PC unit in the data path of the basic processing unit of the previous stage and a key value to be extracted in the key register unit, and the output thereof is an extracted fixed-length key value; the splicing unit is configured to splice several fixed-length key values output by the second PA units to form the key for the position corresponding to the querying matching template, its input is key fields extracted from the several second PA units, and the output thereof is a generated key value.

Further, the extraction unit includes an extraction unit data path and an extraction unit key path, the input of the extraction unit data path is the offset and the field identifier of each field output by the data path of the basic processing unit of the last stage in the basic processing unit of each stage, and the shifted data frame, and the output thereof is an extracted field and a corresponding field identifier; the input of the key path is an offset and a field identifier of each field of a protocol header of each stage output by the data path of the basic processing unit of the last stage, and a shifted key frame output by the key path, the output thereof is a key fragment corresponding to each extracted data frame field; if a data packet received by the extraction unit contains an illegal identifier, the extraction unit does not execute an extraction operation any longer, but sends the illegal identifier and an original input data frame descriptor to an upper level system for processing.

Further, the data path and the key path of the extraction unit are the same in structure and respectively include N groups of extraction modules, N mapping tables and N groups of registers, each group of the extraction module, the mapping table and the register respectively corresponds to a network protocol layer; each group of the extraction module of the data path is configured to extract a corresponding field from the data frame output by the data path of the basic processing unit of the last stage according to the received field offset and field identifier, and output the corresponding field to a corresponding data path register; each group of the extraction module of the key path is configured to extract a corresponding field from the key frame output from the key path of the basic processing unit of the last stage according to the received field offset and field identifier, and output the corresponding field to a corresponding key path register, and perform an XOR operation on the extracted corresponding fields of the data frame and the key frame to obtain required data; each mapping table is configured to store a physical address of a register corresponding to each field identifier in the corresponding network protocol layer.

Further, in the parser, the cascade number of the basic processing units is equal to the maximum number of encapsulation layers to be parsed, and an encapsulation protocol of each layer corresponds to the basic processing unit of one stage.

By adopting the above technical solution, the present invention has the following advantages: 1. the pattern templates in the PB unit and the lookup table in the PC unit in the basic processing unit of each stage can be rewritten according to the user definition, thus the reconfiguration of hardware is realized, having the very high flexibility, and supporting the parsing of user-defined network protocols. 2. The present invention adds a key path to the structure of the data path and destroys the function of normally Trojan triggering instructions through the de-cooperation processing of the packet header, thus the active defense of hardware Trojans is realized and the requirement of high security is satisfied. Therefore, the present invention can be widely applied to the design of the parser of the switch forwarding engine chip.

DETAILED DESCRIPTION

The present invention will be described below in detail in combination with the embodiments and the drawings.

Figure 1:
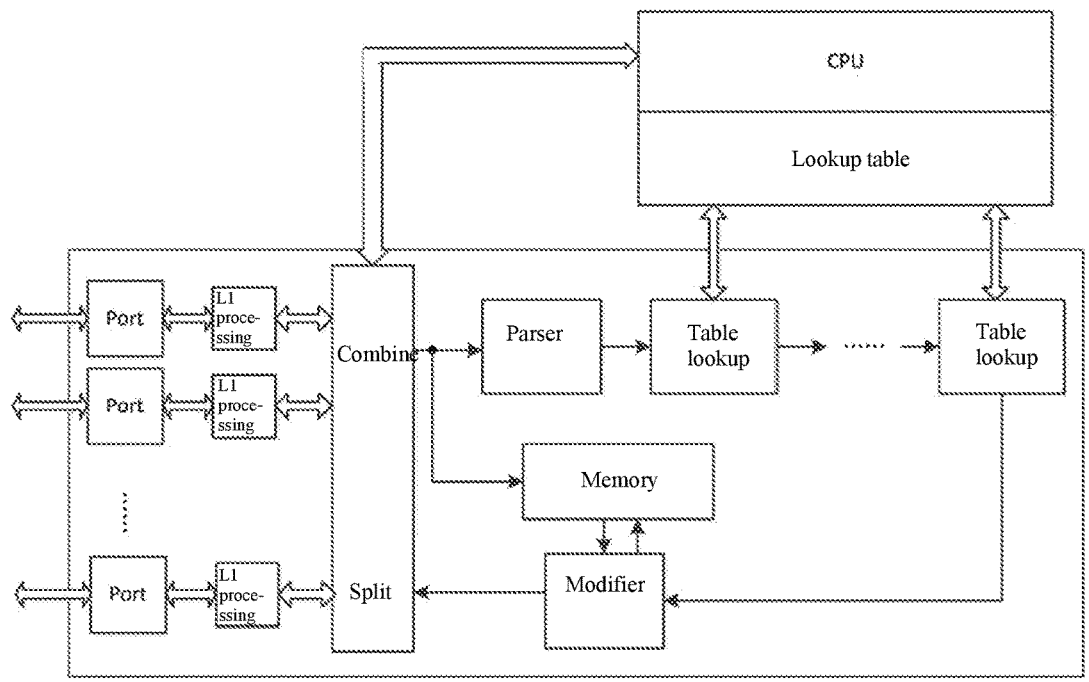
FIG. 1 is a typical structural diagram of a switch forwarding engine chip.

Referring to FIG. 1, firstly the typical structure and working principle of a switch forwarding engine chip are briefly introduced. The working principle of an Ethernet switch forwarding engine chip is as follows: a forwarding engine is externally connected with Ethernet ports of a switch to receive packets from each port. After the packets from different ports are parsed at a L1 layer, the second layer packets are aggregated stage by stage to form one stream (a combining process), and then are input in series into the switch forwarding engine. The forwarded packets processed by the switch forwarding engine are then sent to the corresponding destination ports for output after de-multiplexing (a splitting process). The forwarding engine is internally connected with a CPU and a series of lookup tables (some of which are implemented by a TCAM) through a high-speed interface, the received packets are buffered in a packet buffer, and at the same time, several bits (typically 1024 bits) of the headers of the packets are sent to a parser together with description information (descriptors) such as port information and storage address. The parser parses the received packet header and descriptor information, identifies and extracts useful fields and sends the fields to a subsequent table lookup logic, and the table lookup logic obtains forwarded information according to the values of the fields in the packets. This process involves the interaction with the CPU and the lookup table, which may be simply understood as a series of table lookup operations. After table lookup stage by stage, packet forwarding information is finally obtained, that is, processing operations can be performed, and the descriptions (new descriptors) of these operations are sent to a modifier. According to the new descriptors, the modifier takes out the packets from the memory, modifies the frame format and content (replacement, addition and deletion of header fields), re-encapsulates them to form a new packet and sends it to a splitter for forwarding.

In an actual parser module, in addition to parsing the packet header and extracting the fields, it also carries an original input descriptor. This descriptor is passed to the subsequent stage together with the packet along a pipeline, but does not participate in an extraction process. In order to simplify the structure and highlight the core components in the present invention, the described invention features do not include related functional circuits that copy the descriptor.

Figure 2:
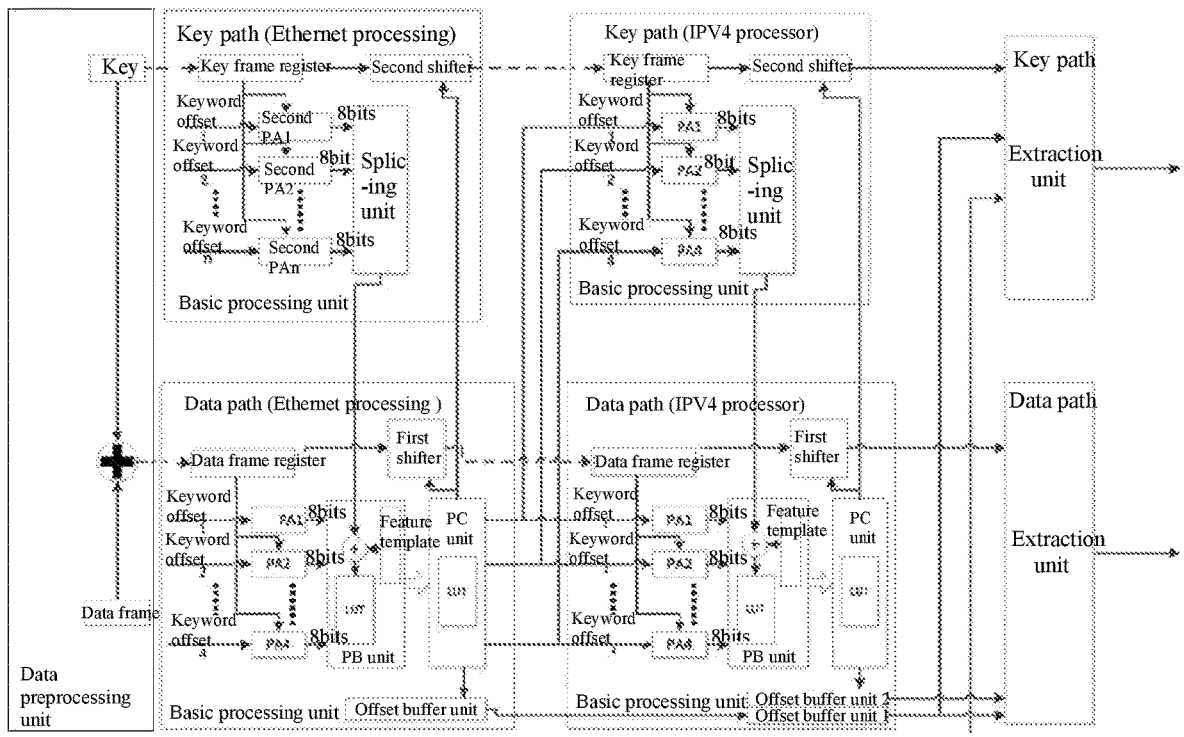
FIG. 2 is an overall structural diagram of a reconfigurable switch forwarding engine Parser capable of disabling hardware Trojans according to the present invention.

Referring to FIG. 2, the present invention provides a reconfigurable switch forwarding engine parser capable of disabling hardware Trojans, which includes a data preprocessing unit, several cascaded basic processing units and an extraction unit (Extractor) connected with the basic processing unit of a last stage. The data preprocessing unit is configured to generate an equal-length random number (i.e., a key) according to a packet header input from a switch Ethernet port, intercepted by the parser, perform a bitwise XOR operation on the input packet header and the generated key, and then output an XOR result and the key to the basic processing unit of a first stage; the basic processing units of all stages are the same in structure and respectively include a data path and a key path. The key path of the basic processing unit of the first stage is configured to perform key keyword extraction and shifting on the key output by the data preprocessing unit, send an extracted key keyword value to the data path of the basic processing unit of the current stage, and send a shifted key value to the key path of the basic processing unit of the next stage. The key value received by the basic processing unit of each stage is called as a key frame. The data path of the basic processing unit of the first stage recovers the packet header after the XOR operation, i.e., the data frame, by using the key keyword value extracted by the key path of the current stage, then performs field extraction and shifting, sends an extracted field offset to the key path of the basic processing unit of the current stage and the key path and data path of the basic processing unit of the next stage, and sends a shifted data frame to the data path of the basic processing unit of the next stage; the basic processing units of other stages sequentially perform field extraction and shifting on the key frame and the data frame, and then output to the basic processing unit of the next stage; the extraction unit performs field extraction on the key frame and the data frame from the key path and the data path of the basic processing unit of the last stage according to the received key value and field offset, and forwards the key field and the data field to a subsequent packet processing part.

In the basic processing unit of each stage, the data path includes a data frame register unit, a first shifter unit, several first PA units (keyword extraction units), a PB unit (a query matching unit), a PC unit (a table lookup unit), and several offset buffer units. The input of the data frame register unit is the data frame sent by the data preprocessing unit or the basic processing unit of the previous stage, and the output thereof is connected with the first shifter unit of the current stage; the first shifter unit is a shifting unit to rightwards shift a frame header and a payload of each stage to a fixed starting position of a corresponding stage (the fixed starting position may be configured through an external port), its input is an offset of an encapsulation frame header of the current stage output by the PC unit of the current stage and a data frame stored in the data frame register unit of the current stage, and the output thereof is a shifted new data frame; the first PA units are the keyword extraction units of the PB unit, the input of each first PA unit is a key field offset output by the PC unit in the basic processing unit of the previous stage and a data frame stored in the data frame register unit of the current stage, and the output thereof is an extracted fixed-length keyword; the PB unit is a query matching unit, the input of the PB unit is a fixed-length keyword output by each first PA unit of the current stage and a key keyword value output by the key path of the current stage, the output thereof is protocol classification and type information (hereafter referred to as protocol information) corresponding to a template matching a combination of the input keywords, when matching is performed, an XOR operation is performed on the matching template and a key stored in the PB unit, and then matching is performed, and if the combination of the keywords does not match any pattern template, the packet is considered as an illegal packet and an illegal identifier is sent to the PC unit; the PC unit is a table lookup unit, its input is protocol information of the PB unit of the current stage, and the output thereof is a keyword offset required by the basic processing unit of the next stage, an offset and a field identifier of each field in an encapsulation frame header of the current stage, and an offset of the data frame of the next stage; when a next layer protocol does not need to be parsed according to an extraction protocol of the current stage and should be skipped, the PC unit outputs a bypass signal to the basic processing unit of the next stage; when what is sent by the PB unit is illegal identifier information, the PC unit outputs an illegal identifier to the basic processing unit of the next stage; after receiving the bypass signal, the basic processing unit of each subsequent stage copies with complete fidelity, the key, the data frame and the input of the first PA unit to a corresponding port of the next stage, and does not execute other operations any longer; when receiving the illegal identifier signal, the basic processing unit of each subsequent stage copies the key and the data frame to the next stage with complete fidelity, and does not execute other operations any longer, and copies the illegal identifier to the subsequent stage at the same time; the number of the offset buffer units is the same as the number of stages of the basic processing units, and the offset buffer units are configured to store the offsets and field identifiers of all fields parsed by the basic processing units of all stages, and the offset and field identifier of each field in the encapsulation frame header of the current stage, the inputs thereof are all outputs of the offset buffer units of the basic processing unit of the previous stage, and the offset and the field identifier of each field in the encapsulation frame header of the current stage output by the PC unit of the current stage, the output thereof is all stored data, which is connected to the offset buffer unit of the basic processing unit of the next stage.

In the basic processing unit of each stage, the key path, similar to the data path, includes a key register unit, a second shifter unit, several second PA units and a splicing unit. The input of the key register unit is the key frame from the basic processing unit of the previous stage or the data preprocessing unit, and the output thereof is connected with the second shifter unit; the second shifter unit is a shifting unit and rightwards shifts the key of each stage and a subsequent key bit to a fixed starting position of the corresponding stage, its input is the key frame of the key register unit and the offset of the data frame of the current stage output by the PC unit in the data path of the basic processing unit of the current stage, and the output thereof is a shifted new key frame, which is sent to the key path of the basic processing unit of the next stage; the number of the second PA units in the key path is the same as the number of the first PA units in the data path, each of the second PA units corresponds to each of the first PA units one to one, the input of each second PA unit includes a keyword offset and a key frame to be extracted from the key register unit, wherein the keyword offset is the same as the keyword offset input to the corresponding second PA unit in the data path of the current stage, and the output is an extracted fixed-length key value; the splicing unit is configured to splice several fixed-length key values output by the second PA units and extract the spliced fixed-length key values as a key for querying a corresponding position of a matching template, the input is key fields extracted from the several second PA units, and the output thereof is a generated key value.

The extraction unit includes two parts, i.e., an extraction unit data path and an extraction unit key path, the input of the extraction unit data path is the field offset and the field identifier of the several offset buffer units of the data path in the basic processing unit of the last stage, and the data frame in the shifter unit, and the output thereof is an extracted field and a corresponding field identifier; the input of the key path is a key offset and a field identifier of several offset buffer units of the data path in the basic processing unit of the last stage, and a key value of the shifter unit of the key path, the output thereof is an extracted key fragment.

The data path and the key path of the extraction unit are the same in structure and respectively include N groups of extraction modules, N mapping tables and N groups of registers, and each group of extraction module, mapping table and register respectively corresponds to a network protocol layer. Each group of extraction modules of the data path is configured to extract a corresponding field from the data frame or key frame output by the shifter unit according to the received field offset and field identifier output by the offset buffer unit, and output the corresponding field to a corresponding register of the data path; each group of extraction module of the key path is configured to extract a corresponding field from the key frame of the key path of the basic processing unit of the last stage according to the received field offset and field identifier, output the corresponding field to a corresponding register of the key path, and perform an XOR operation on the extracted corresponding fields of the data frame and the key frame to obtain required data; each mapping table is configured to store a physical address of a register corresponding to each field identifier in the corresponding network protocol layer; if a data packet received by the extraction unit contains an illegal identifier, the extraction unit does not execute an extraction operation any longer, but sends the illegal identifier and an originally input packet descriptor to an upper level system for processing.

Further, the system provided by the present invention further includes a field identifier index unit, which outputs the extracted data frame field and the corresponding key fragment to the register of the corresponding address. When necessary, the content of the original data frame field can be recovered by performing a bitwise XOR operation on the data frame field and the associated key fragment.

Further, in the parser, the number N of the cascaded basic processing units is equal to the maximum number of encapsulation layers to be parsed, and an encapsulation protocol of each layer corresponds to the basic processing unit of one stage.

Further, in the data path, the capacity of the data frame register unit is determined by the maximum length of the packet header to be processed, which is fixed during hardware design.

Further, in the data path, the number of the first PA units is determined according to the requirements of the protocols supported by the system, which is preferably and uniformly fixed to be the maximum value of the number of keywords to be extracted from the encapsulation frame header correspondingly processed by the basic processing unit of each stage.

Further, in the data path, the PB unit contains a match lookup table, which stores a mapping relationship between pattern templates and protocol information, and the contents (pattern templates and protocol information) of the match lookup table are capable of being written from the outside through an external port of a table memory, so as to realize configurability.

Further, in the data path, the PC unit contains two lookup tables: a current lookup table (LUT_CUR) and a next stage lookup table (LUT_NXT), and the inputs (addresses) of the tables are respectively a classification identifier for the current layer protocol type and a classification identifier for the next layer protocol type output by the PB unit, the output of the current lookup table (LUT_CUR) includes an offset and a field identifier of each field in the encapsulation frame header of the current stage and an offset of the data frame of the next stage, the output of the next stage lookup table (LUT_NXT) includes a key field offset required by the basic processing unit of the next stage, and the contents of the current lookup table and the next stage lookup table are capable of being written from the outside through an external port of a table memory, so as to realize configurability.

Further, in the data path, the I/O bit width and capacity of the lookup tables in the PB unit and the PC unit and the size of Offset_buffer are determined according to the requirements of the protocols supported by the system, and are fixed after being selected in the design phase.

The present application will be further described below in detail in combination with the specific embodiments:

An Ethernet-IPV4 data frame is one of common data frame structures in networks. According to the rules of protocol layers and the OSI reference model, Ethernet protocol and IPV4 protocol respectively correspond to a data link layer (L2) and a network layer (L3). Therefore, referring to FIG. 2, the overall structure of the reconfigurable parser capable of defending hardware Trojan attacks in the present embodiment is as follows: the number of processing stages is two, input data are processed by two cascaded basic processing units with the same structure, which respectively process headers in frame formats of Ethernet protocol and IPV4 protocol, and parsed results are sent to a final extractor module to uniformly extract key fields in the data frame and the key, and at this moment the parsing function of the parser is completed.

First 1024 bits of an input Ethernet-IPV4 packet are taken and subjected to a bitwise XOR operation with an equal-length random number (key) before entering the parser. The XORed result is sent to a data frame register (Frame Reg) of a data path of a basic processing unit of the Ethernet processing layer, and the key is sent to a key register (Key Reg) of a key path of the basic processing unit of the Ethernet processing layer, at the same time the data path of the basic processing unit receives an offset of keyword extraction configured by the upper level. For the process of parsing the Ethernet-IPV4 data frame, the maximum number of key fields extracted in the protocols in two layers is four, so the number of the PA units in the basic processing unit of each stage is fixed to four.

The data path of the Ethernet processing layer consists of six functional units, including a data frame register unit (Frame Reg), a shifter unit, PA units, a PB unit, a PC unit and offset buffer units. The data path receives the data frame subjected to the XOR operation with the key and stores it in the data frame register unit (Frame Reg). The shifter unit is a shifting unit, whose input is 1024-bit data of the data frame register unit (Frame Reg) and an offset of the data frame from the PC unit of the current processing layer, shifts the payload data of the protocol of the current stage to a starting position corresponding to the protocol of the next stage according to a shifting amount, and the output thereof is a shifted new data frame; the four PA units respectively receive the keyword offset value configured by the upper level, and take out the data frame from the data frame register unit for corresponding extraction, and the length of the field extracted from each PA unit is fixed to 8 bits. The PB unit is a query matching unit, whose input is the 32-bit data spliced by using the key fields extracted from the four PA units, and the 32-bit key output from the key layer of the basic processing unit, this key will be respectively subjected to an XOR operation with all matching templates stored in the PB unit to obtain final matching templates, and the output thereof is protocol type information corresponding to a template matching a combination of input keywords; the PC unit is a lookup table unit, whose input is the protocol type information from the PB unit, and the output thereof is a keyword offset required by the basic processing unit of the next stage, an offset and a field identifier of each field in an encapsulation frame header of the current stage, and an offset of a data frame of the next stage; the offset buffer units are configured to store the offsets and the field identifiers of all fields parsed at the previous stage, and the offset and the field identifier of each field in the encapsulation frame header of the current stage, according to the present embodiment, the capacity of the offset buffer unit of each stage is fixed to 2*10*8 bits, respectively corresponding to two parts, i.e., the field offset and the field identifier, information of 10 fields to be extracted, and 8-bit word length of each entry of information (the field offset and the field identifier), and the output is connected to the offset buffer unit 1 of the IPV4 basic processing unit.

The PB unit contains a match lookup table, whose input is 32-bit data spliced by using the key fields extracted from the four PA units, and the content of each row of the table includes: a 32-bit mask for filtering out irrelevant information in the input 32 bit data; a 32-bit matching template for matching the fields after being masked; the current layer protocol type identifier and the next layer protocol type identifier corresponding to the features of the key fields, the size of each identifier is 8 bits. The capacity of the match lookup table is fixed during hardware design, and the contents of table entries are capable of being written from the outside through an external port of a table storage, so as to realize configurability. When performing matching, the PB unit firstly performs a bitwise XOR operation on the stored matching templates and the 32-bit key sent by the key path of the current stage, the input 32-bit key field is firstly subjected to a bitwise AND operation with the matching masks corresponding to the templates to convert irrelevant bits to 0, then the matching templates subjected to scrambling are compared with the masked key field, and a matching entry is found if the values are equal.

Ethernet layer configuration information:
Content of the match lookup table of the PB unit:
(
['00','00000000','00000000','00','00'],
['01','ffff0000','08000000','00','05'],
['01','ffff0000','81000000','00','03'],
['01','ffff0000','88470000','00','02'],
['01','ffff0000','88480000','00','02'],
['01','ffff0000','88a80000','00','04'],
['01','ffff0000','92000000','00','04'],
['01','ffff0000','93000000','00','04'],
);
Content of the current lookup table of the PC unit:
(
['00','00','00000000000000000000',
'00000000000000000000','00'],
['01','00','20305060700000000000',
'01020304050000000000','0e'],
);
Content of the next stage lookup table of the PC unit:
(
['00','00000000'],
['01','0d0e0000'],
['02','03000000'],
['02','03000000'],
['03','03040000'],
['04','03040708'],
['05','010a0000'],
);

The PC unit contains two lookup tables: a current lookup table (LUT_CUR) and a next stage lookup table (LUT_NXT). The inputs (addresses) of the tables are respectively a current layer protocol type classification identifier and a next layer protocol type classification identifier output by the PB unit, which are respectively 8 bits. The output of the current lookup table (LUT_CUR) includes: an offset and a field identifier of each field in the encapsulation frame header of the current stage, the size of which is respectively 10*8 bits and which are output to the offset buffer unit 1 of the current stage for storage; and an offset of the data frame of the next stage, the length of which is 8 bits and which is output to the shifter units of the data path and key path of the basic processing unit of the current stage. The capacity of table entries is fixed during design, and the content of the table is written from the outside through an external port of a table memory, so as to realize configurability. The output of the next stage lookup table (LUT_NXT) includes a key field offset required by the basic processing unit of the next stage, the size of which is 4*8 bits and which is respectively output to the four PA units of the data path of the IPV4 processing layer. The capacity of the table is fixed during design, and the content of the table is written from the outside through an external port of a table memory, so as to realize configurability.

Similar to the data path, the key path of the Ethernet processing layer consists of four functional units, including a key register unit (Key Reg), a shifter unit, PA units and a splicing unit. An input 1024-bit random number (key) with the same length as the data frame is stored in the key register unit (Key Reg), the four key offset values are respectively sent to the four PA units, and keyword extraction is performed on the key in the key register unit (Key Reg), and the length of the extracted field is the same as that in the data path and is also 8 bits. The splicing unit splices the 8-bit key segments extracted from the four PA units to perform an XOR operation with the query templates of the PB unit in the data path to obtain new query templates for matching. The shifter unit receives the key data from the key register unit (Key Reg), receives the offset information of the data frame found by the PC unit of the data path at the same time, performs a corresponding shifting operation, and outputs the results to the key register unit (Key Reg) of the IPV4 processing layer of the next stage.

The data path of the IPV4 processing layer consists of the same components and the module function as the data path of the Ethernet layer. The number of the PA units of the shifter is also four, and the length of the field extracted by each PA unit is also fixed to 8 bits. However, it includes two offset buffer units, and the offset buffer unit 1 is configured to temporarily store the offsets and field identifiers of all fields parsed by the Ethernet layer, so as to transmit them rearwards, and the size and the word length thereof are respectively the same as that of the offset buffer unit 1 in the basic processing unit of the Ethernet layer. The offset buffer unit 2 is configured to store the offset and field identifier of each field in the header of the current stage. The capacity of the offset buffer unit 2 of the IPV4 processing layer according to the present example is fixed to 2*10*8 bits, respectively corresponding to two parts, i.e., the field offset and the field identifier of the IPV4 layer, information of 10 fields to be extracted and 8-bit word length of each entry of information (the field offset and the field identifier), which are output to the final extractor module.

Similar to the data path, the key path of the IPV4 processing layer consists of the same components as the key path of the Ethernet layer, the number of the PA units is four, the length of the extracted field is also 8 bits, and the key field offset is the output of the PC unit of the basic processing unit of the previous stage. The key data of the key register (Key Reg) come from the shifter of the key path of the previous stage, and the shifter outputs a shifted key frame to the final extractor module. Relevant program languages are as follows:

IPV4 layer configuration information:
Content of the match lookup table of the PB unit:
(
['00','00000000','00000000','00','00'],
['02','01000000','00000000','00','02'],
['02','01000000','01000000','00','05'],
['05','0fff0000','05060000','01','06'],
['05','0fff0000','05110000','01','07'],
['05','0fff0000','06060000','02','06'],
['05','0fff0000','06110000','02','07'],
['05','0fff0000','07060000','03','06'],
['05','0fff0000','07110000','03','07'], );
Content of the current lookup table of the PC unit:
(
['00','00','00000000000000000000',
'00000000000000000000','00'],
['02','00','18200000000000000000',
'01020000000000000000','04' ],
['05','01','081020304048506080a0',
'0102030405060708090a','14'],
['05','02','081020304048506080a0',
'0102030405060708090a','18'],
['05','03','081020304048506080a0',
'0102030405060708090a','1c'],
);
Content of the next stage lookup table of the PC unit:
['00','00000000'],
['02','03000000'],
['02','03000000'],
['06','0d000000'],
['07','01020000'],
);

The input of the data path of the extraction unit is the position offset values and field identifiers of the fields to be extracted in the offset buffer unit 1 and the offset buffer unit 2 of the IPV4 processing layer, and the data frame in the shifter of the data path of the IPV4 processing layer, and the extracted fields are output; the input of the key path of the extraction unit is the position offset values and field identifiers of the fields to be extracted in the offset buffer unit 1 and the offset buffer unit 2 of the IPV4 processing layer, and the key in the shifter of the key path of the IPV4 processing layer, and the extracted key fields are output.

The above embodiments are only used to describe the present application. The structure, connection mode and manufacturing process of each component may be varied. Any equivalent transformation and improvement based on the technical solution of the present application shall not be excluded from the scope of protection of the present application.

The invention claimed is:

1. A reconfigurable switch forwarding engine parser capable of disabling hardware Trojans, wherein the reconfigurable switch forwarding engine parser comprises:
a data preprocessing unit, several cascaded basic processing units, and an extractor connected with a basic processing unit of a last stage;
wherein basic processing units of all stages are the same in structure and respectively comprise a data path and a key path;
the data preprocessing unit is configured to generate an equal-length key according to a packet header input from a switch Ethernet port and intercepted by the reconfigurable switch forwarding engine parser, output the key as a key frame to the key path of the basic processing unit of a first stage, perform a bitwise XOR operation on the packet header and the key, and then output an XORed result as a data frame to the data path of the basic processing unit of the first stage;
the key path of the basic processing unit of the first stage is configured to perform key keyword extraction and shifting on the key frame, send an extracted key keyword value to the data path of the basic processing unit of a current stage, and send a shifted key value to the key path of the basic processing unit of a next stage;
the data path of the basic processing unit of the first stage performs key field extraction and shifting on the data frame according to the key keyword value extracted by the key path of the basic processing unit of the current stage, send an offset of an extracted field to the key path of the basic processing unit of the current stage and the key path and data path of the basic processing unit of the next stage, and send a shifted data frame to the data path of the basic processing unit of the next stage;
basic processing units of other stages sequentially perform field extraction and shifting on a received key frame and data frame, and then output the key frame and the data frame to the basic processing unit of the next stage;
the extractor performs field extraction on the key frame and the data frame from the key path and the data path of the basic processing unit of the last stage according to a received key value and keyword offset, and forwards a result to a subsequent packet processing part;
wherein, when receiving an illegal identifier from the basic processing unit of a previous stage, the basic processing unit of each subsequent stage copies the key and the data frame to the basic processing unit of the next stage without executing other operations any longer, and copies the illegal identifier to the basic processing unit of the next stage at a same time; and
wherein the data preprocessing unit and the basic processing units are hardware.

2. The reconfigurable switch forwarding engine parser capable of disabling hardware Trojans according to claim 1, wherein in the basic processing unit of each stage, the data path comprises a data frame register unit, a first shifter unit, several first keyword extraction units, a query matching unit, a table lookup unit, and several offset buffer units;
an input of the data frame register unit is the data frame sent by the data preprocessing unit or the basic processing unit of the previous stage, and an output of the data frame register unit is connected with the first shifter unit of the current stage;
the first shifter unit rightwards shifts a protocol frame header and a payload of the current stage to a fixed starting position of a next layer protocol frame, and an input of the first shifter unit is an offset of a next layer protocol frame header output by the table lookup unit of the current stage in a current data frame and a data frame output by the data frame register unit of the current stage, and an output of the first shifter unit is a shifted new data frame;
an input of each first keyword extraction unit is a key field offset output by the table lookup unit in the basic processing unit of the previous stage and a data frame to be extracted from the data frame register unit of the current stage, and an output of each first keyword extraction unit is an extracted fixed-length key field;
an input of the query matching unit is a fixed-length key field output by each first keyword extraction unit of the current stage and a key keyword value output by the key path of the current stage, and an output of the query matching unit is protocol classification and type information corresponding to a template matching a combination of input key fields, and if a key field does not match any pattern template, the illegal identifier is sent to the table lookup unit;
an input of the table lookup unit is protocol classification and type information of the query matching unit of the current stage, and an output of the table lookup unit is a key field offset required by the basic processing unit of the next stage, an offset and a field identifier of each field in an encapsulation frame header of the current stage, and an offset of the data frame of the next stage;

when a next layer protocol does not need to be parsed according to an extraction protocol of the current stage and should be skipped, the table lookup unit outputs a bypass signal to the basic processing unit of the next stage; when what is sent by the query matching unit is the illegal identifier, the table lookup unit outputs the illegal identifier to the basic processing unit of the next stage; after receiving the bypass signal, the basic processing unit of each subsequent stage copies with complete fidelity, the key, the data frame and the input of the first keyword extraction unit to corresponding ports of the next stage, and does not execute other operations any longer; after receiving the illegal identifier, the basic processing unit of each subsequent stage copies with complete fidelity the key and the data frame to the basic processing unit of the next stage, does not execute other operations any longer, and copies the illegal identifier to the basic processing unit of the next stage at the same time;

inputs of the offset buffer units are all outputs of the offset buffer units of the basic processing unit of the previous stage, and the offset and the field identifier of each field in the encapsulation frame header of the current stage output by the table lookup unit of the current stage, and outputs of the offset buffer units are all stored field offsets and field identifier data;

wherein the data frame register units, the first shifter units, the several first keyword extraction units, the query matching units, the table lookup units, and the several offset buffer units are hardware.

3. The reconfigurable switch forwarding engine parser capable of disabling hardware Trojans according to claim 2, wherein a number of the first keyword extraction units is determined according to a total length of all keywords to be extracted from the encapsulation frame header correspondingly processed by the basic processing unit of each stage and a keyword bit width that each first keyword extraction unit is capable of extracting.

4. The reconfigurable switch forwarding engine parser capable of disabling hardware Trojans according to claim 2, wherein the query matching unit contains a match lookup table, which stores a mapping relationship between pattern templates and protocol information, and contents of table entries are capable of being written through an external port of a table memory, and when matching is performed, a bitwise XOR operation is performed on matching templates stored in the query matching unit and the key from the key path of the current stage, and then matching is performed.

5. The reconfigurable switch forwarding engine parser capable of disabling hardware Trojans according to claim 2, wherein the table lookup unit contains two lookup tables: a current lookup table and a next stage lookup table, an input of the current lookup table and an input of the next stage lookup table are respectively a current layer protocol type classification identifier and a next layer protocol type classification identifier output by the query matching unit, an output of the current lookup table comprises an offset and a field identifier of each field in the encapsulation frame header of the current stage and an offset of an encapsulation frame header of the next stage in the current data frame, an output of the next stage lookup table comprises a key field offset required by the basic processing unit of the next stage, and table entry contents of the current lookup table and the next stage lookup table are capable of being written through an external port of a table memory.

6. The reconfigurable switch forwarding engine parser capable of disabling hardware Trojans according to claim 2, wherein in the basic processing unit of each stage, the key path comprises a key register unit, a second shifter unit, a second keyword extraction unit, and a splicing unit;

an input of the key register unit is the key frame of the previous stage or the data preprocessing unit, and an output of the key register unit is connected with the second shifter unit;

the second shifter unit rightwards shifts the key of each stage and a subsequent key bit to a fixed starting position of a corresponding stage, an input of the second shifter unit is the key of the key register unit and the offset of the encapsulation frame header of the next stage output by the data path of the basic processing unit of the current stage in the current data frame, and an output of the second shifter unit is a shifted new key frame;

a number of the second keyword extraction units is the same as the number of the first keyword extraction units in the data path of the current stage, an input of each second keyword extraction unit is a key field offset output by the table lookup unit in the data path of a basic processing unit of the previous stage and a key value to be extracted in the key register unit, and an output of each second keyword extraction unit is an extracted fixed-length key value;

the splicing unit is configured to splice several fixed-length key values output by the second keyword extraction units to form a key for a position corresponding to a querying matching template, an input of the splicing unit is key fields extracted from several second keyword extraction units, and an output of the splicing unit is a generated key value;

wherein the key register units, the second shifter units, the second keyword extraction units, and the splicing units are hardware.

7. The reconfigurable switch forwarding engine parser capable of disabling hardware Trojans according to claim 1, wherein the extractor comprises an extractor data path and an extractor key path, an input of the extractor data path is an offset and a field identifier of each field output by the data path of the basic processing unit of the last stage in the basic processing unit of each stage, and the shifted data frame, and an output of the extractor data path is an extracted field and a corresponding field identifier; an input of the extractor key path is an offset and a field identifier of each field of a protocol header of each stage output by the data path of the basic processing unit of the last stage, and a shifted key frame output by the key path, an output of the extractor key path is a key fragment corresponding to each extracted data frame field; if a data packet received by the extractor contains an illegal identifier, the extractor does not execute an extraction operation any longer, but sends the illegal identifier and an originally input data frame descriptor to an upper level system for processing.

8. The reconfigurable switch forwarding engine parser capable of disabling hardware Trojans according to claim 1, wherein a data path and a key path of the extractor are the same in structure and both comprise N groups of extraction modules, N mapping tables and N groups of registers, each group of the extraction modules, the mapping table and the register respectively corresponds to a network protocol layer, each group of the extraction modules of the data path is configured to extract a corresponding field from the data frame output by the data path of the basic processing unit of the last stage according to a received field offset and field identifier, and output the corresponding field to a corresponding data path register, each group of the extraction modules of the key path is configured to extract a corresponding field from the key frame output from the key path of the basic processing unit of the last stage according to the received field offset and field identifier, output the corresponding field to a corresponding key path register, and perform an XOR operation on the extracted corresponding fields of the data frame and the key frame to obtain required data; each mapping table is configured to store a physical address of a register corresponding to each field identifier in the corresponding network protocol layer.

9. The reconfigurable switch forwarding engine parser capable of disabling hardware Trojans according to claim 1, wherein in the reconfigurable switch forwarding engine parser, a number of cascaded basic processing units is equal to a maximum number of encapsulation layers to be parsed, and an encapsulation protocol of each layer corresponds to a basic processing unit of one stage.

\* \* \* \* \*